United States Patent
Xiao et al.

(10) Patent No.: US 9,761,015 B2
(45) Date of Patent: Sep. 12, 2017

(54) METHOD FOR DETERMINING DIMENSIONS IN AN INDOOR SCENE FROM A SINGLE DEPTH IMAGE

(71) Applicant: Mitsubishi Electric Research Laboratories, Inc., Cambridge, MA (US)

(72) Inventors: Yong Xiao, Ann Arbor, MI (US); Chen Feng, Ann Arbor, MI (US); Yuichi Taguchi, Arlington, MA (US); Vineet R. Kamat, Ann Arbor, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/698,200

(22) Filed: Apr. 28, 2015

(65) Prior Publication Data

US 2016/0321827 A1 Nov. 3, 2016

(51) Int. Cl.
*G06K 9/00* (2006.01)
*G06T 7/60* (2017.01)
*G06T 7/73* (2017.01)
*G06T 7/12* (2017.01)
*G06T 7/62* (2017.01)

(52) U.S. Cl.
CPC .......... *G06T 7/602* (2013.01); *G06K 9/00* (2013.01); *G06T 7/12* (2017.01); *G06T 7/62* (2017.01); *G06T 7/75* (2017.01); *G06T 2200/04* (2013.01); *G06T 2207/10024* (2013.01); *G06T 2207/10028* (2013.01); *G06T 2207/30244* (2013.01)

(58) Field of Classification Search
None
See application file for complete search history.

(56) References Cited

PUBLICATIONS

L.-C. Wang. Enhancing construction quality inspection and management using RFID technology. Autom. Constr., vol. 17, No. 4, pp. 467-479, May 2008.
K. Kim and G. E. Gibson. Interactive simulation modeling for heavy construction operations. Autom. Constr., vol. 12, No. 1, pp. 97-109, Jan. 2003.
Y. M. Kim, J. Dolson, M. Sokolsky, V. Koltun, and S. Thrun. Interactive acquisition of residential floor plans. IEEE International Conference on Robotics and Automation (ICRA), pp. 3055-3062, May 2012.
S. Bae, A. Agarwala, and F. Durand. Computational rephotography. ACM Trans. Graph., vol. 29, No. 3, pp. 24:1-24:15, Jun. 2010.

*Primary Examiner* — Atiba O Fitzpatrick
(74) *Attorney, Agent, or Firm* — Gene Vinokur; James McAleenan; Hironori Tsukamoto

(57) ABSTRACT

A method determines dimensions in a scene by first acquiring a depth image of the scene acquired by a sensor, and extracting planes from the depth image. Topological relationships of the planes are determined. The dimensions are determined based on the planes and the topological relationships. A quality of the dimensions is evaluated using a scene type, and if the quality is sufficient outputting the dimensions, and otherwise outputting a guidance to reposition the sensor.

13 Claims, 4 Drawing Sheets

Algorithm 1 Extract Door Frame Boundary Points

1: function EXTRACTBOUNDARY(*CP1, CP2*)
2:     *BP2* = EXTRACTEACHBOUNDARY(*CP1, CP2*)
3:     *BP1* = EXTRACTEACHBOUNDARY(*CP2, CP1*)
4:     return *BP1, BP2*;

5: function EXTRACTEACHBOUNDARY(*CP1, CP2*)
6:     is_searched[ 1:size(*CP2*)] = false;
7:     for each $pt \in CP1$ do
8:         // Search the nearest point to *pt* in *CP2*
9:         *k* = search_nearest_point(*CP2, pt*);
10:        is_searched[*k*] = true;
11:     end for
12:     for each *i*=1:size(*CP2*) do
13:        if is_searched[*i*] = true then
14:           *BP*.add(*CP2*[*i*]);
15:        end if
16:     end for
17:     return *BP*

*FIG. 2*

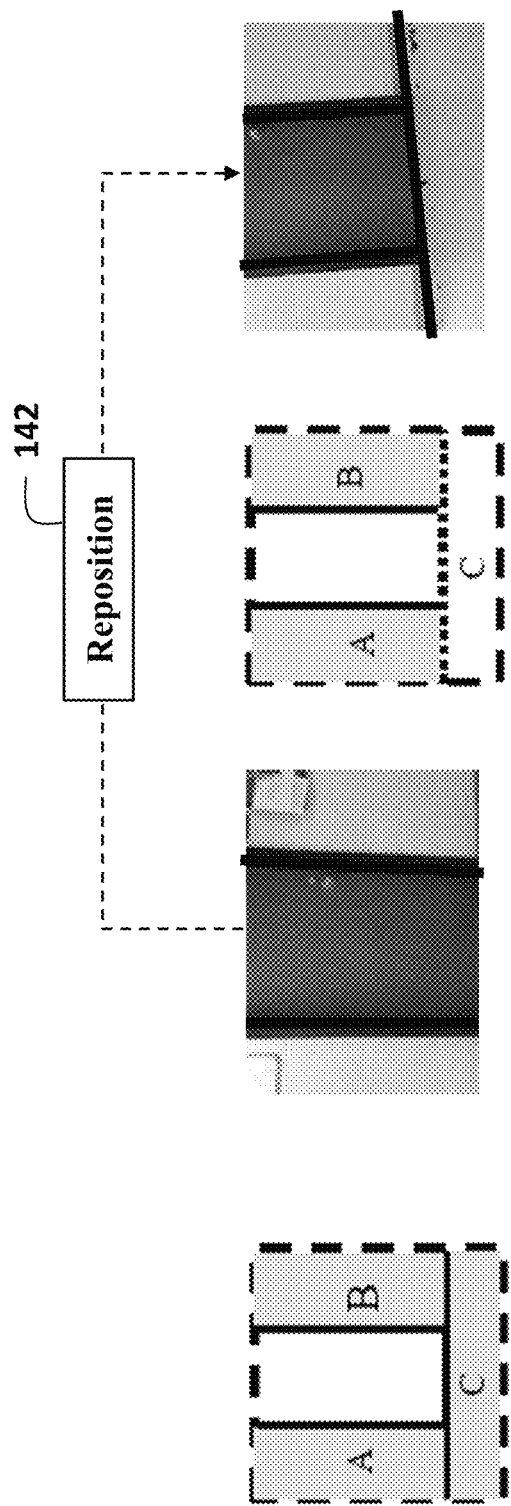

METHOD FOR DETERMINING DIMENSIONS IN AN INDOOR SCENE FROM A SINGLE DEPTH IMAGE

FIELD OF THE INVENTION

This invention relates generally to computer vision, and more particularly to determining dimensions in an indoor scene.

BACKGROUND OF THE INVENTION

Dimensional information of an indoor scene, such as a room and a hallway, can be useful for a wide variety of applications. During a building construction, dimensional information can be used to monitor the structure to ensure that it meets requirements of specifications and drawings. During building maintenance, dimensional information can determine whether the structure remains consistent with existing building codes, and to quantify any flaws, e.g., cracks. In addition, in the context of construction automation, dimensional information is useful for any robot performing tasks during the construction, such as installing windows.

For a window installing robot, the robot needs to know the actual size of the window frame as constructed, instead of the designed size due to tolerance discrepancies. With this dimensional information, the robot can install the window correctly and ensure that it fits into the frame accurately. Additionally, the dimensions of any openings are of high significance for an autonomous robot to move in indoor environments. For example, when passing through a door, the robot has to detect the dimension of the opening space so that it can automatically decide whether to directly go through this door or to use another way.

In the prior art, three-dimensional (3D) sensors that use a rotating laser have been commonly used for generating a 3D model of an indoor scene and measuring dimensions in the 3D model. Those sensors can generate 3D models with long-range and 360-degree coverage from a single location. However, those sensors are expensive and require a long scanning time, during which those sensors need to be placed at a fixed location.

Recently 3D sensors that have short-range and small field-of-view coverage have been readily available. Those sensors enable single-shot, real-time scanning. To generate large-scale 3D models using those sensors, one method registers multiple frames acquired by those sensors using simultaneous localization and mapping (SLAM) techniques. However, that method accumulates drift errors in the registration, leading to lower accuracy for dimensional measurements.

In terms of user interaction, one method provides a construction quality inspection and management system with user interaction to quickly access to data. Another method for an interactive simulation modelling provides step-by-step guidance for the user to build a simulation model. The user guidance acts as a tutor for the user. Given a reference image, yet another method provides guidance for the user to take an image from the same viewpoint where the reference image was taken.

SUMMARY OF THE INVENTION

In many civil engineering tasks, dimensional analysis of a scene, such as an indoor scene including man-made structures, is significant for spatial analysis and decision-making. Tasks such as as-built geometry generation need to efficiently interpret the critical dimensions of specific objects (e.g., diameter of a pipe, width of an opening) in a potentially cluttered scene based on data gathered from different positions.

Therefore, one embodiment of the invention provides a method for determining dimensions in an indoor scene from a single depth image acquired by a depth sensor.

A depth sensor is a 3D sensor that acquires a depth image of a scene. The depth image is a two-dimensional image wherein each pixel represents a depth (or distance to the scene from the sensor). Depth images can be converted to 3D point clouds by, for each pixel, back-projecting a ray using intrinsic parameters of the sensor and generating a 3D point at the measured depth. If the depth image is combined with an intensity or color, e.g., red, green, and blue (RGB), image, an RGB-D image (i.e., a 3D colored point cloud) can be obtained.

Then, by extracting planes and performing geometric analysis, the dimensions of structures of interest in the scene can be obtained from the single depth image. The method evaluates a quality of the dimensional data and measurements and provides interactive guidance, e.g., using a graphical user interface (GUI), for positioning the sensor at a different pose to acquire higher quality data, from which more accurate geometric measurements can be obtained. As defined herein, a pose has six dimensions (6D), three translational components and three rotational components.

The invention uses, in part, a user-guided dimensional analysis approach that is able to obtain the dimensions of indoor scenes from a depth sensor. We perform dimensional analysis on a single depth image obtained from a depth sensor to achieve high computational efficiency and to avoid error accumulations in multi-frame registration using SLAM techniques.

Due to the limited field of view of the sensor, a single depth image cannot guarantee that all the interesting dimensional information can be determined. In addition, the quality of the determined dimension is limited by the sensor's intrinsic accuracy.

Therefore, to overcome the drawbacks of using a single depth image, a knowledge-based user guidance system is developed to guide a user (or a robot on which the sensor is arranged) to reposition the sensor to a better pose so that sufficient and high quality data suitable for dimensional analysis is collected. After a high quality single image data is collected, the geometric analysis is performed to obtain the necessary dimensional information.

Our approach is different from the prior art as the method is directly performed on single depth images, rather than a sequence of depth images. The use of a single depth image enables real-time estimation of the dimensional information for indoor scenes, which is important for several applications that focus on automation and robotics.

Moreover, different from prior art approaches, our user guidance system evaluates the data quality of the current image and then suggests the user to reposition the sensor to obtain better results for the application. By simple guidance, this system can lead the user, who does not have to be an expert, to obtain high quality data, and thus high quality dimensional measurements.

BRIEF DESCRIPTION OF THE DRAWINGS

FIG. 2 is a block diagram of a procedure to extract boundary points of coplanar planes according to embodiments of the invention;

FIGS. 4A, 4B, 4C and 4D are schematics and annotated images of an opening supported by planes in indoor scenes according to embodiments of the invention.

DETAILED DESCRIPTION OF THE PREFERRED EMBODIMENTS

Figure 1:
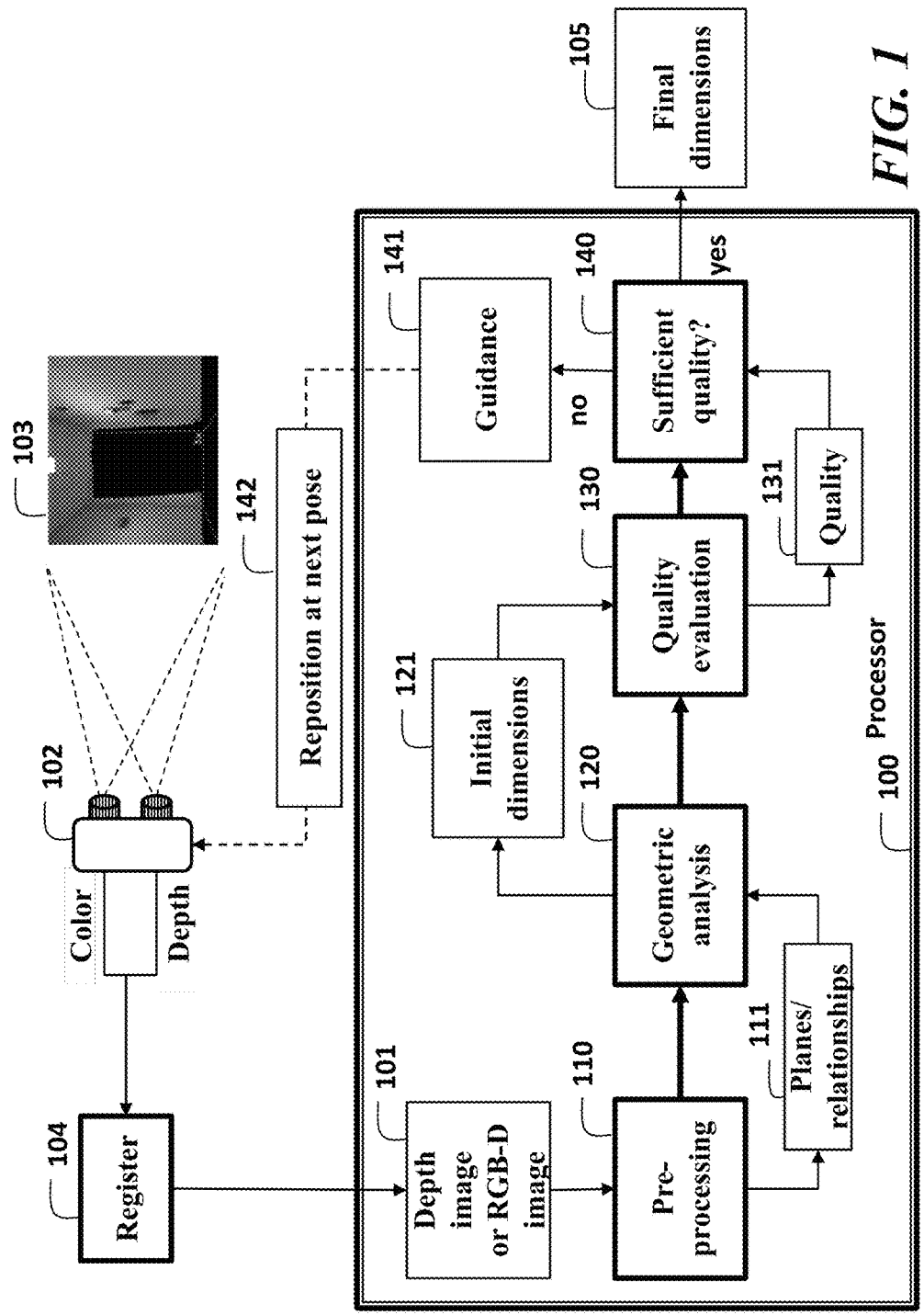
FIG. 1 is a block diagram of a method for determining dimensions of an indoor scene according to embodiments of the invention.

As shown in FIG. 1, the embodiments of our invention provide a method for determining dimensions in an indoor scene 103 as represented in a single depth image 101. The depth image can be acquired by a depth sensor 102. The focus of the invention is on the dimensional analysis of indoor infrastructure with planar surfaces. The scene can have an associate type, e.g., room or hallway. The type can define predetermined shapes, such as boxes or openings.

In some embodiments, a Kinect™ for Xbox sensor is used as the depth sensor to obtain 3D point clouds of indoor scenes. Equipped with an infrared (IR) camera and a color (RGB) camera, Kinect is able to acquire a depth image and a color image of the scene. Therefore, in some, but not all embodiments, the depth image can be registered 104 with the color image by using sensor calibration to obtain an RGB-D image 101.

Pre-processing 110 is applied to the depth image or the RGB-D image 101. The pre-processing includes extracting planar surfaces, and determining topological relationships of these planes 111. Based on the planes and their relationships, geometric analysis 120 is performed to determine the initial dimensions 121 of the scene.

Using a scene type and the initial dimensional measurements, a quality 131 of the image and initial dimensions is evaluated 130. If the quality is sufficient 140, then the final dimensions 105 are output. Otherwise, guidance 141 is output to improve the quality of the data for obtaining better dimensions. For example, the guidance can indicate a better pose 142 for the sensor. The output can be to a user to manually reposition the sensor, or a robot to do so automatically.

The steps of the method can be performed in a processor 100 connected to memory for storing the image and other data structures used by the method, and input/output interface by busses as known in the art. In essence, the method transforms a depth image of real-world objects, e.g., structures in an indoor scene, to dimensions of the objects.

Indoor Scenes and Planar Surfaces

Most indoor scenes are enclosed within planar surfaces. Based on this assumption, the geometric analysis is performed to obtain the dimensional information of specific infrastructures. To extract planar surfaces efficiently, a plane extraction procedure is applied to the depth image, see e.g., Feng et al, "Fast plane extraction in organized point clouds using agglomerative hierarchical clustering," IEEE International Conference on Robotics and Automation (ICRA), pp. 6218-6225, 2014.

The pixels in the depth image are segmented into groups that are used to construct a graph, where the groups are represented by nodes, and edges represent neighboring groups. Then, an agglomerative hierarchical clustering is performed on this graph to merge nodes on the same plane. The planes are refined by pixel-wise region growing.

If the color image is available along with the depth image, i.e., the RGB-D image is used, and then the color information can be used to further segment the planes. For example, the colors appearing in each plane can be clustered, and the plane is segmented according to the clusters.

After all the planes are extracted from the depth image, based on the plane parameters, the topological relationships among these planes are estimated. Four types of topological plane relationship are defined as follows:

parallel: if the normal vectors of two planes are parallel to each other, then the two planes are parallel planes;

coplanar: if two planes have the same parameters, then the two planes are coplanar planes and parallel;

intersecting: if two planes are not parallel to each other, then the two planes are intersecting planes; and perpendicular: if the normal vectors of two planes are perpendicular (orthogonal to each other), then the two planes are perpendicular to each other.

It should be noted that due to the uncertainty in sensor measurements, these relationships are determined approximately. For example, if the angle of normal vectors of two planes is less than 5 degrees, then the planes are considered as parallel planes.

Geometric Analysis

If all the measurements from the sensor are accurate, then the geometric dimension information can be directly determined based on the geometric representations of the scene. However, the sensor is not perfect and the measurements have uncertainty. To obtain accurate dimensional information, a least squares procedure is used. For example, the distance between two parallel planes and the distance between the boundaries of coplanar planes are of interest. Two methods for these two distance determinations are used to obtain accurate estimation.

Distance Between Parallel Planes

After extracting the planes, the plane parameters are estimated by the least squares procedure. A 3D plane equation is $ax+by+cz+d=0$, wherein a, b, c, and d are the plane parameters. If the measurements are given as $A=[x, y, z, 1]$, where x, y, z are column vectors containing all the X, Y, Z coordinates of all the 3D points assigned to this plane, and the plane parameters are $P=[a, b, c, d]^T$, then a linear system can be constructed as $$AP=0. \tag{1}$$

To obtain the least squares estimation, one solution is to perform singular value decomposition (SVD) on the matrix A and then the plane parameters P are extracted from the results of SVD.

Because there are parallel plane sets, the plane parameter estimation results can be made more accurate by using this prior information. Suppose Plane i and Plane j are parallel to each other while the points assigned to these planes are represented by $A_i$ and $A_j$ respectively. To enforce the parallel constraint, Plane i and Plane j share the same normal vector and are defined as $$a_i x_i + b_i y_i + c_i z_i + d_i = 0$$

$$a_i x_j + b_i y_j + c_i z_j + d_j = 0. \tag{1}$$

Then, a linear system similar to Equation (1) can be constructed with $$P = [a_i, b_i, c_i, d_i, d_j]^T, \text{ and} \tag{3}$$

-continued $$A = \begin{bmatrix} x_i & y_i & z_i & 1 & 0 \\ x_j & y_j & z_j & 0 & 1 \end{bmatrix}.$$

Therefore, by utilizing the SVD, the plane parameters of parallel planes are determined using all the points on both of the planes.

After the parallel plane parameters are obtained, the distance between parallel planes is determined directly based on the plane parameters. For example, the distance between Plane i and Plane j is $$\text{dist}_{ij} = |d_i - d_j|. \quad (4)$$

Distance Between Boundaries of Coplanar Planes

The distance between boundaries of coplanar planes is required to estimate, e.g., a width of a door frame. In this context, the width is the distance between the boundaries of the left and right walls (two coplanar planes) of the door. To determine this width, boundary points of the door frame are extracted, and then two lines are fitted based on the boundary points. The distance between these two parallel lines is the width of the door frame.

In order to automatically locate door frames, the topological relationships between extracted plane surfaces are estimated based on the plane fitting results. After detecting the coplanar planes, all the coplanar planes are rotated to a 2D space.

FIG. 2 is a block diagram of pseudocode for extracting door frame boundary points. The boundary points of the two planes, CP1 and CP2, are separately extracted by using a 2D alpha shape algorithm, see e.g., Bernardini et al., "Sampling and Reconstructing Manifolds Using Alpha-Shapes," Purdue e-Pubs, a Serv. Purdue Univ. Libr., pp. 1-11, 1997.

Then, for the first plane, for each point in CP1, a nearest point in the other plane boundary points CP2 is searched. After iterating all the points on the first plane, the points in CP2 that have been searched as the nearest points, BP2, are the door frame boundary points on the second plane. By repeating the process for the second plane, the door frame boundary points on the first plane, BP1, are found. After the door frame boundary points BP1 and BP2 are detected, the two lines are estimated from the two sets of boundary points respectively. The distance is estimated from the two lines.

User Guidance

Our user guidance system is based on the prior knowledge of the scene of interest. The goal of the user guidance system is to indicate the quality of the current frame data in terms of obtaining the dimensional information from the scene. We define high quality data as an image including sufficient data from the supporting planar surfaces of the infrastructure features of interest.

The user guidance system evaluates the quality of obtained data based on the characteristics of the sensor and the scene. To fully utilize the prior information, the user guidance system visualizes the topological relationships of planar surfaces. We describe two general cases, box shape and opening.

Box Shape

Figures 3A, 3B, 3C, 3D:
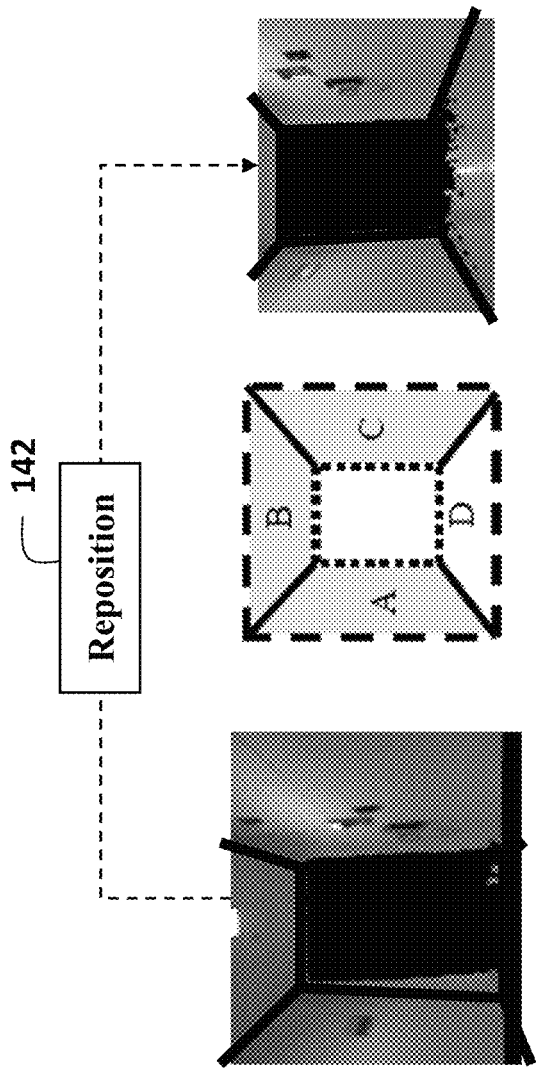
FIGS. 3A, 3B, 3C and 3D are schematics and annotated images of a box shape supported by planes in indoor scenes according to embodiments of the invention.

FIG. 3A shows a box shape defined as a shape that contains two sets of two parallel planes, while the two sets are perpendicular to each other. As shown in FIG. 3A, Plane A and Plane C are parallel to each other, as are Plane B and Plane D. Moreover, Plane A is perpendicular to Plane D. The solid lines denote the intersection lines between planar surfaces. We use a hallway scene as an example.

To obtain the dimension of this structure, i.e., the width and height of the hallway, all the four planes should be acquired by the sensor. The user guidance is designed to make sure that the sensor acquires sufficient points from all the four planar surfaces with high accuracy.

The user guidance assumes that at least three planes are detected from the scene. This assumption is reasonable because if the sensor only observes two planar surfaces, then the sensor may not be able to obtain all the four planes. This happens when the hallway is too high and it is impossible for the sensor to capture all the four planes. If one planar surface is not obtained in the data, then the geometric analysis is performed based on the partial data. Based on the prior information of the scene and the captured data, the potential shape is reconstructed so as to guide the user.

For example as shown in Error! Reference source not found.if Plane D, i.e., the floor is not detected from the data, then the height of the hallway is unknown, but the width of the hallway can still be determined based on the two walls. Since the ceiling and the two walls are detected, the intersection lines between the ceiling and the walls can be derived. Based on the prior information and the determined intersection lines, a potential height is estimated and the box shape (white lines) can be constructed as shown in FIG. 3C. Therefore, the user guidance system can provide the corresponding guidance for this context, and reposition 142 the sensor to a better pose to acquire the floor as shown in FIG. 3D to obtain the final dimensions.

Because the method detects that there are no points from Plane D, the system suggests the user to reposition the sensor to obtain points from Plane D, the floor. By following the guidance, the sensor is lowered, or declined in orientation, and then an image, FIG. 3D, is obtained. In this image, all the four planes A-D can be extracted from the depth image and a box shape similar to the template is constructed. Thus, both the height and the width of the hallway can be determined by geometric analysis.

Apart from repositioning the sensor to acquire missing planes, the user guidance can also provide comments on the quality of the measurements based on the data quality. For example, an uncertainty of the depth sensor usually increases as the distance between the scene and the sensor increases. Thus, if scene elements are far from the sensor, the points of this object have high uncertainty, which affects the accuracy of dimensional measurements.

Therefore, when all the four planes are detected from the data, for each plane, the distance between its centroid and the sensor is determined. If the distance to the sensor is larger than a threshold, e.g., 3.0 m, the user guidance system suggests the user to move the sensor closer to that plane so as to minimize the measurement uncertainty.

Opening

An opening structure is defined as an opening in a planar surface while there is another supporting planar surface, e.g., the floor, for the first planar surface. We use a door frame that is an opening in a wall as an example. As shown in FIGS. 4A-4D, Plane A and Plane B are vertical walls and are on the same plane, i.e., their relationship is coplanar, while Plane C is the floor, which is perpendicular to Plane A and Plane B. To obtain accurate width of the opening, the floor is necessary to provide constraints in reconstructing the walls. Thus, the user guidance is implemented to guarantee that the floor is observed by the sensor.

If Plane C, the floor is not measured in the data, the system can still reconstruct the two solid lines in FIG. 4B, where the width is estimated based on these two solid lines. However, due to inaccurate measurements of the sensor around depth boundaries, the line estimation is not accurate, and thus the width is also not always accurate. By comparing FIGS. 4A and 4C, the user guidance system indicates to the user to reposition the sensor lower so that the data of the floor can be obtained. In this way, a new image with better quality data is acquired in FIG. 4D. The estimation of door width is improved by adding the constraint that the lines are vertical to the floor.

In addition, because the door usually indents in the walls, the wall might block the view of the sensor if the sensor view direction is not perpendicular to the door. Therefore, the user guidance system also takes this into consideration. The normal vector of the door surface is used for this evaluation. If the sensor view direction is not vertical to the door surface, the view direction is not parallel to the normal vector of the door surface. Therefore, the user guidance system is capable of offering feedback about adjusting the view direction of the sensor.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining dimensions in a scene, comprising steps of:
    acquiring a single depth image of the scene acquired by a sensor;
    extracting planes from the single depth image;
    determining topological relationships of the planes;
    determining the dimensions based on the planes and the topological relationships;
    evaluating a quality of the dimensions of the planes acquired from the single depth image using a scene type, and if the quality is sufficient; then
    outputting the dimensions; otherwise
    outputting a guidance to reposition the sensor, and wherein the steps are performed in a processor.

2. The method of claim 1, wherein the depth image is combined with a red, green, and blue (RGB) image of the scene to form an RGB-depth image.

3. The method of claim 1, wherein the guidance is output to a user.

4. The method of claim 1, wherein the guidance is output to a robot on which the sensor is arranged.

5. The method of claim 1, wherein the extracting further comprises:
    segmenting pixels in the depth image into groups;
    representing the groups as nodes in a graph, wherein edges represent neighbouring groups; and
    applying agglomerative hierarchical clustering to the graph to merge nodes on the same plane.

6. The method of claim 1, wherein the topological relationships include:
    parallel planes if normal vectors of two planes are parallel to each other;
    coplanar planes if two planes have identical parameters;
    intersecting planes if two planes are not parallel; and
    perpendicular planes if the normal vectors of two planes are perpendicular to each other.

7. The method of claim 1, further comprising:
    using a least squares procedure for extracting the planes.

8. The method of claim 1, wherein the scene type defines a predetermined shape.

9. The method of claim 8, wherein the predetermined shape includes a box shape and an opening shape.

10. The method of claim 9, wherein the box shape contains two sets of two parallel planes and the two sets are perpendicular to each other.

11. The method of claim 9, wherein the opening shape contains two coplanar planes and a plane that is perpendicular to the two coplanar planes.

12. A non-transitory computer-readable recording medium having stored therein steps of a method that causes a computer to execute a process for determining dimensions in a scene, the method comprising the steps of:
    acquiring a single depth image of the scene acquired by a sensor;
    extracting planes from the single depth image;
    determining topological relationships of the planes;
    determining the dimensions based on the planes and the topological relationships;
    evaluating a quality of the dimensions of the planes acquired form the single depth image using a scene type, and if the quality is sufficient; then
    outputting the dimensions; otherwise
    outputting a guidance to reposition the sensor.

13. A system for determining dimensions in a scene including a processor in communication with a memory, the system comprising:
    a depth sensor configured to acquire a single depth image in the scene and transmit the single depth image with a color image,
    wherein the memory is configured to store steps of a method that causes the processor to execute a process for determining dimensions in a scene, wherein the process comprises steps of:
    acquiring the single depth image of the scene acquired by a sensor;
    extracting planes from the single depth image;
    determining topological relationships of the planes;
    determining the dimensions based on the planes and the topological relationships;
    evaluating a quality of the dimensions of the planes acquired form the single depth image using a scene type, and if the quality is sufficient; then
    outputting the dimensions; otherwise
    outputting a guidance to reposition the sensor.

* * * * *